No. 658,588. Patented Sept. 25, 1900.
H. S. REYNOLDS & E. M. PEACOCK.
CLOSURE FOR RECEPTACLES.
(Application filed Dec. 4, 1899.)
(No Model.)
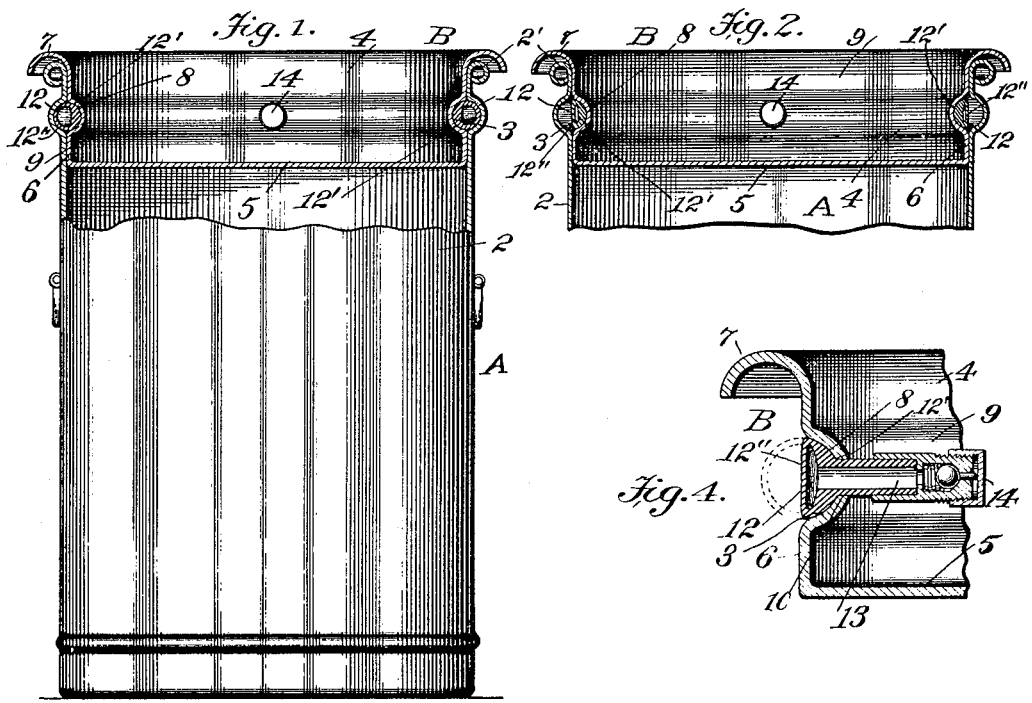
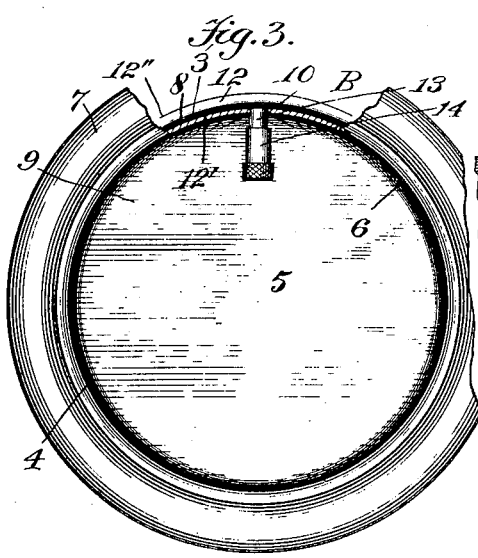
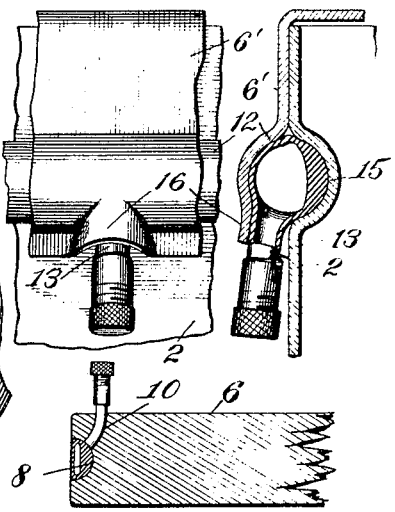
Witnesses:
Inventors:
Henry S. Reynolds.
Edward M. Peacock.
By their Attorney,
F. H. Richards.

UNITED STATES PATENT OFFICE.

HENRY S. REYNOLDS AND EDWARD M. PEACOCK, OF NEW YORK, N. Y., ASSIGNORS TO THE IRON CLAD MANUFACTURING COMPANY, OF SAME PLACE.

CLOSURE FOR RECEPTACLES.

SPECIFICATION forming part of Letters Patent No. 658,588, dated September 25, 1900.

Application filed December 4, 1899. Serial No. 739,127. (No model.)

*To all whom it may concern:*

Be it known that we, HENRY S. REYNOLDS, residing at New York, (Brooklyn,) in the county of Kings, and EDWARD M. PEACOCK, residing at New York, (Dunton,) in the county of Queens, State of New York, citizens of the United States, have invented certain new and useful Improvements in Closures for Receptacles, of which the following is a specification.

This invention relates to receptacles, and more particularly to that class thereof designated as "fluid-tight" receptacles; and the object of the invention is to provide an improved organization of the receptacle-body and its closure, one of said parts carrying in an improved manner an inflatable member or gasket provided with a valve in position to be manipulated thereby to enable the inflation and contraction of such gasket, so that when the gasket is inflated the closure will be locked against removal or displacement, while the receptacle is fluid-tight, and when contracted the closure can be readily and freely removed, such gasket constituting a fluid-tight seal and also a locking means for the closure, the improved organization herein shown and described being simple in its construction and effective and durable in use.

In the drawings accompanying and forming part of this specification, Figure 1 is a view of one form of receptacle, with the upper part thereof in section, showing the present improvement applied thereto, the gasket being in its inflated condition and locking the closure in position against removal and forming a fluid seal for the receptacle. Fig. 2 is a view of the upper part of the receptacle shown in Fig. 1 with the gasket contracted to enable the closure to be freely removed. Fig. 3 is a top view of the organization shown in Fig. 1. Fig. 4 is an enlarged sectional view of one portion of the closure detached, the dotted lines illustrating the gasket when inflated. Fig. 5 is an enlarged sectional view of one portion of a receptacle and its closure, showing a somewhat different organization. Fig. 6 is a view looking toward the right in Fig. 5, and Fig. 7 is a view of a solid closure having this inflatable gasket connected therewith.

Similar characters of reference designate like parts in all the figures of the drawings.

The receptacle (designated in a general way by A) may be of any desired size, shape, and construction to adapt it for the particular purpose for which it is to be used; but in the present instance it is shown as an ammunition-can—such as a powder or cartridge can, usually constructed of sheet metal—and comprises a body 2, having its usual cylindrical formation. This body 2 in one form thereof is shown provided with an annular recess 3 in its inner wall, usually formed adjacent to the upper edge of the body. This recess may be of any desired shape, but is preferably shown concaved in cross-section.

The closure (designated in a general way by B) in one form thereof comprises a hollow or chambered structure 4, comprising a plate 5 and a flange 6, fitting within the body 2, such flange extending in parallelism with the adjacent walls of the body. In one construction shown this flange 6 terminates at the upper edge thereof in a laterally-extending rim 7, curved in cross-section and adapted to project over the upper edge 2' of the body 2. The closure-flange is provided with an annular recess 8 of some suitable shape (shown herein as concaved in cross-section) and communicates with the chamber 9 of the closure by an opening 10. Located within this recess 8 is an inflatable member or gasket 12, preferably composed of rubber and preferably having its engaging or inner side 12' conforming to the shape of the recess (and therefore shown convex in cross-section) and having its outer side 12'' so formed that it will be flush with the outer walls of the closure-flange. This gasket or band is provided with a nipple 13, which projects through the opening 10 of the flange and carries a valve 14 of some suitable construction adapted to effectively prevent the escape of air and at the same time permit the inflation of the gasket. A suitable closure or cap is usually provided for the valve.

In the present instance the term "valve" as used in the claims may be interpreted to include all its necessary adjuncts, such as the cap.

If desired, it will be readily seen that the cover may have its flange 6 projecting downwardly on the interior of the receptacle instead of upwardly, as shown in Fig. 1, in which instance the construction may be substantially similar to that shown in said figure except that the free edge of the flange would be below the closure-plate 5 and the valve would project through an opening in the closure-plate B. The form of cover shown in Fig. 1, however, is the preferred form, since a cover may be used, if desired, to close in said chamber, and thereby protect the valve from being tampered with and from injury.

In the form shown in Figs. 5 and 6 the receptacle-body 2 is shown provided with an annular recess 15 on its outer side, in which the inflatable member or gasket 12 is disposed, the cover in this form being provided with a downwardly-extending flange 6', fitting over the outside of the body and having a bulged portion or outlet 16 to permit the nipple 13 of the gasket to project below the edge of the cover and into position to enable the valve to be manipulated.

In the form shown in Fig. 7 the closure is illustrated as a solid member composed of some suitable material, usually of wood, provided with the recess and gasket shown in Fig. 1. In this instance, however, the opening 10 from the recess 8 communicates with the top of the closure to enable the nipple to project into position to permit its valve to be manipulated. In this construction and, in fact, in all of constructions where the closure is not provided with a laterally-extending rim 7 it will be seen that the same could be located midway in the body or at any other desired point to enable it to be brought directly in contact with the contents of the receptacle, since in some instances the annular recess in the receptacle-body may be dispensed with or several of such recesses may be formed in the body-wall.

In use the closure with the gasket in a contracted condition (shown, for instance, in Figs. 2 and 4) is assembled with the receptacle-body, and if the body and closure are provided with recesses the parts are so assembled that such recesses will be contiguous to or in communication with each other, whereupon the gasket is inflated by any suitable means—as, for instance, by a pump—through its valve and nipple until it is expanded into position to engage the wall of the receptacle, as in Fig. 1, or the wall of the closure, as in Fig. 5, until it practically fills the same, whereupon it will be seen that the parts are firmly and rigidly locked together against displacement or removal of one relatively to the other, while at the same time a fluid-tight seal is provided.

In practice, as has been demonstrated by use and tests, the locking of the parts together is such that the entire receptacle can be lifted by the closure or cover while fully loaded without the displacement or removal of the closure, while at the same time the contents thereof, especially when of a fluid nature, are prevented from leakage even though the can be upset and rests upside down, so that the organization is such that an improved receptacle is provided particularly adapted for use as an ammunition-can, such as a powder or cartridge can or flask.

When it is desired to remove the closure, it is merely necessary to open the valve and exhaust the air from the gasket, which exhaust, together with the removal of the closure, can be accomplished in a very few seconds.

The improvement presented is particularly adapted for governmental use for the carriage of powder or cartridges or other ammunition, since it presents a receptacle in which the closure thereof can be quickly locked in position and sealed fluid-tight without the necessity of any locking means other than that which is a part of the closure or the receptacle-body itself, while at the same time the closure can be removed by a few seconds' work.

While that member or part which carries the gasket may have the same merely encircle the wall thereof without the provision of a recess for its reception, yet nevertheless by the provision of a recess the gasket may have its outer face flush with the walls of the closure or body, as the case may be, and thus enable the closure to be more quickly assembled and without being obstructed, while at the same time such recess maintains the gasket in position when the closure is removed from the receptacle and also assists in the locking and sealing of the closure in position.

While in some cases it may not be necessary to provide that part which does not carry the gasket with a recess, since the closure, it is believed, will be sufficiently locked in position and the joint fluid-tight without the same, yet nevertheless it will be seen that by the provision of such recess the positive locking and sealing of the closure against displacement or removal is assured, since the gasket expands into the recess and so prevents the disassemblage of the parts.

Having described my invention, I claim—

1. A receptacle comprising a body and a closure, said closure comprising a sheet-metal plate having a flange or rim bent at an angle thereto and extending in parallelism with the wall of said body and adapted to frictionally engage said wall, and an inflatable gasket carried by one of said parts and adapted when inflated to engage the other of said parts and form a tight joint.

2. A receptacle comprising a body and a closure, said closure comprising a plate having a flange or rim extending at an angle to said plate, and an inflatable gasket carried by one of said parts and located at one side of the plane of said closure-plate and adapted when inflated to engage the other of said parts and form a tight joint.

3. A metallic receptacle comprising a body the metal of which is bent or bulged at one part thereof to form an annular groove or recess; a closure comprising a plate having a flange or rim extending at an angle to said plate, and which flange is also bent or bulged at one part thereof to form an annular groove or recess adapted to register with said body groove or recess, and which flange-recess is located at one side of the plane of said plate; and an inflatable gasket carried by the recess or groove of one of said parts and having a valve in position below the upper edge of said body.

4. A receptacle comprising a body and a closure comprising a sheet-metal plate having a flange or rim extending at an angle to said plate and adapted to fit into said body, and an inflatable gasket carried on said flange or rim at one side of the plane of said plate and adapted when inflated to engage the wall of said body and form a tight joint.

5. A receptacle comprising a body; a chambered closure provided with an annular flange or rim adapted to fit into, and extending in parallelism with the wall of, the receptacle-body, and having an opening through said flange from the outer to the inner side thereof; and an inflatable gasket carried on the outer side of said flange and adapted when inflated to engage the wall of said body and form a tight joint, said gasket having a nipple projecting through said opening and into the interior or chamber of said closure and provided with a valve.

6. A receptacle comprising a body and a chambered closure provided with an annular flange adapted to fit into said receptacle, said flange having an annular recess communicating at one point with the interior of said closure by an opening, and an inflatable gasket located in said recess and adapted when inflated to engage the wall of said body and form a tight joint, said gasket having a nipple projecting laterally through said opening and provided with a valve located in said closure-chamber.

7. A metallic receptacle comprising a body the metal at one portion of which is bent or bulged outwardly to form an interiorly-located annular recess; a chambered closure comprising a plate provided with a flange or rim extending at an angle thereto and adapted to fit into said body, and the metal of which flange at one portion thereof is also bent or bulged inwardly into the interior of said closure to form an exteriorly-located annular recess located at one side of the plane of said plate and adapted to register with the annular recess of the body, and which flange-recess is in communication with said closure-chamber by an opening; and an annular inflatable gasket located in said flanged recess and having a nipple projecting laterally through said opening and into the chamber of said closure and provided with a valve normally in position below the edge of said closure.

8. A metallic receptacle comprising a body the metal at one portion of which is bent or bulged outwardly to form an interiorly-located annular recess; a chambered closure comprising a plate provided with a flange or rim extending at an angle thereto and adapted to fit into said body, and the metal of which flange at one portion thereof is also bent or bulged inwardly into the interior of said closure to form an exteriorly-located annular recess located at one side of the plane of said plate and adapted to register with the annular recess of the body, and which flange-recess is in communication with said closure-chamber by an opening, said flange having a laterally-extending rim adapted to extend over the upper edge of said body; and an annular inflatable gasket located in said flange-recess and having a nipple projecting laterally through said opening and into the chamber of said closure and provided with a valve normally in position below the edge of said closure.

9. A chambered closure comprising a plate having a rim extending at an angle thereto, said rim being bent or bulged inwardly to form an annular exteriorly-located recess at one side of the plane of said plate, and provided with an opening communicating with the interior of said closure, and an inflatable gasket located in said recess and having a valved nipple projecting through said opening and into said chamber and normally below the edge of said rim or flange.

HENRY S. REYNOLDS.
EDWARD M. PEACOCK.

Witnesses:
JOHN S. CLARK,
C. A. WEED.